United States Patent
Kato

(10) Patent No.: US 7,379,437 B2
(45) Date of Patent: May 27, 2008

(54) RADIO NETWORK CONTROLLER CAPABLE OF HANDING OVER CIPHERING INFORMATION FROM ONE TO ANOTHER

(75) Inventor: Hidenori Kato, Tokyo (JP)

(73) Assignee: NEC Corporation, Tokyo (JP)

( * ) Notice: Subject to any disclaimer, the term of this patent is extended or adjusted under 35 U.S.C. 154(b) by 240 days.

(21) Appl. No.: 11/141,388

(22) Filed: Jun. 1, 2005

(65) Prior Publication Data

US 2005/0272450 A1 Dec. 8, 2005

(30) Foreign Application Priority Data

Jun. 2, 2004 (JP) .............................. 2004-163933

(51) Int. Cl.
  *H04Q 7/00* (2006.01)
(52) U.S. Cl. ........................ 370/328; 455/411; 455/414
(58) Field of Classification Search ................ 370/328; 455/411, 414, 428; 380/201, 255; 713/151, 713/163, 171
See application file for complete search history.

(56) References Cited

U.S. PATENT DOCUMENTS

| | | | |
|---|---|---|---|
| 6,535,979 B1 * | 3/2003 | Britschgi et al. ........... | 713/163 |
| 6,668,170 B2 | 12/2003 | Costa et al. | |
| 2002/0035682 A1 * | 3/2002 | Niemi et al. ................. | 713/151 |
| 2004/0009773 A1 | 1/2004 | Kato | |
| 2004/0039910 A1 * | 2/2004 | Isokangas et al. .......... | 713/171 |
| 2004/0131186 A1 * | 7/2004 | Kasuya et al. .............. | 380/255 |
| 2005/0026607 A1 * | 2/2005 | Hwang et al. .............. | 455/428 |

FOREIGN PATENT DOCUMENTS

| | | |
|---|---|---|
| GB | 2 398 974 A | 9/2004 |
| JP | 5-244225 | 9/1993 |
| JP | 2001-144806 | 5/2001 |
| WO | WO 01/65883 A1 | 9/2001 |
| WO | WO 02/15600 A3 | 2/2002 |

* cited by examiner

*Primary Examiner*—Sanh D. Phu
(74) *Attorney, Agent, or Firm*—Foley & Lardner LLP

(57) ABSTRACT

In a radio network controller (RNC) (2), a control portion (22) reads ciphering parameter from a protocol processing portion (231) for performing a protocol processing of FP (Frame Protocol) and MAC (Medium Access Control) and sets the ciphering parameter in another protocol processing portion (232). By handing over the ciphering parameter from the protocol processing portion (231) to the other protocol processing portion (232), a telephone call is continued and a user equipment (UE) 41 is not conscious of handover of processing.

11 Claims, 4 Drawing Sheets

RADIO NETWORK CONTROLLER CAPABLE OF HANDING OVER CIPHERING INFORMATION FROM ONE TO ANOTHER

This application claims priority to prior Japanese patent application JP 2004-163933, the disclosure of which is incorporated herein by reference.

BACKGROUND OF THE INVENTION

This invention relates to a radio network controller, a mobile communications system, and an operation control method thereof and, in particularly, to a switching method in a protocol processing portion of the radio network controller for use in a wideband-code division multiple access (W-CDMA) communications system.

The W-CDMA communications system, which is defined by a 3rd generation partnership project (3GPP) as a world standard of mobile communications systems, comprises a radio network controller (RNC). The radio network controller (RNC) has, as one of functions, a protocol processing for processing user data in a radio interface.

The radio network controller (RNC) comprises a plurality of protocol processing portions. It will be assumed that a particular protocol processing portion is subjected to firmware renewal or hardware renewal. In this event, there is a method of renewing the particular protocol processing portion by putting the particular protocol processing portion into a blockade state so as to do not receive a new call. However, this method is disadvantageous in that it takes a long time at work because it is necessary to wait for completion of a call during communications.

There is another method of forcibly turning a call for the particular protocol processing portion out. However, this method is disadvantageous in that it results in degradation of service quality for the call during communications.

Furthermore, according to the 3GPP, there is a processing called relocation as a processing for handing over the protocol processing. However, the relocation processing is disadvantageous in that a user equipment (UE) serving as a mobile communication terminal must consciously operate.

Various other techniques related to this invention are already known. By way of example, United States Patent Application Publication No. US 2004/0009773A1 discloses "MOBILE COMMUNICATION SYSTEM AND OPERATION CONTROL METHOD THEREOF." According to US 2004/0009773A1, an ATM (Asynchronous Transfer Mode) network used in a radio access network (RNA) is IP (Internet Protocol)-networked. The radio access network (RAN) comprises a C plane processing device for signaling processing and a plurality of U plane processing devices for user data processing which are provided in a physically separated manner. With the U plane processing devices, a backup U plane processing device is prepared independently from one or more active U plane processing devices. When congestion occurs in the active U plate processing device, part of processing is switched to and inherited by the backup U plane processing device. However, the technique disclosed in US 2004/0009773A1 intends to perform load distribution processing in order to expel processing from concentrating and does not intend to renew firmware or hardware of a particular protocol processing portion by completely putting the particular protocol processing portion into a blockade state.

Furthermore, Japanese Unexamined Patent Publication of Tokkai No. Hei 5-244,225 or JP-A 5-244255 discloses "UNINTERRUPTIBLE SYSTEM CHANGEOVER METHOD" to attain the changeover between an active system and a standby (backup) system without interruption during communication by allowing both the active system and the standby (backup) system to take over a protocol processing state with each other during the changeover between the active system and the standby (backup) system. However, the technique disclosed in JP-A 5-244255 does not give consideration to application to the protocol processing portion of the radio network controller (RNC) in the mobile communication system. More specifically, the protocol processing portion of the radio network controller (RNC) in the mobile communication system includes a function for performing a ciphering processing on user data. On carrying out firmware renewal or hardware renewal of the protocol processing portion in the radio network controller (RNC), it is necessary to changeover between the active system and the standby (backup) system in consideration of ciphering parameter which is a parameter for the ciphering processing. Inasmuch as the technique disclosed in JP-A 5-244255 does not intend to apply to the mobile communication system, the technique disclosed in JP-A 5-244255 cannot really be applied to in a case of carrying out the firmware renewal or the hardware renewal of the protocol processing portion in the radio network controller (RNC).

U.S. Pat. No. 6,668,170 issued to Costa et al. discloses "MOBILE RADIO TELECOMMUNICATIONS SYSTEM WITH SYNCHRONIZED HANDOVER." According to Costa et al., in a mobile radio network such as the Universal Mobile Telephone System, for handover or relocation of control of a mobile from a serving RNC (Radio Network Controller) to a target RNC, the target RNC sends a request to the serving RNC over the Iur link, and the serving RNC returns frame timing information. The target RNC synchronizes the user plane with the serving RNC for this uplink, so that both controllers are also able to send the same packets in synchronism. The core network can suppress the duplicated packet. However, Costa et al. merely discloses the handover or relocation of control of the mobile from the serving RNC to the target RNC, Costa et al. neither discloses nor teaches handover of ciphering parameter from a protocol processing portion to another protocol processing portion in the radio network controller (RNC).

Japanese Unexamined Patent Publication of Tokkai No. 2001-144,806 or JP-A 2001-144806 discloses "NETWORK ADDRESS TAKEOVER METHOD FOR DUPLEX SYSTEM, DUPLEX SYSTEM HAVING NETWORK ADDRESS TAKEOVER FUNCTION AND RECORDING MEDIUM" to provide a network address takeover (handover) method of a duplex system. However, JP-A2001-144806 merely discloses the takeover (handover) of the network address, JP-A 2001-144806 neither discloses nor teaches handover of ciphering parameter from a protocol processing portion to another protocol processing portion in the radio network controller (RNC).

SUMMARY OF THE INVENTION

It is an object of this invention to provide a radio network controller which is capable of continuously communicating without interrupting a telephone call (user data) in a case of switching from one of a plurality of protocol processing portions to another.

It is another object of this invention to provide a radio network controller of the type described, wherein switching of the protocol processing portions does not make a mobile communication terminal consciously operate.

Other objects of this invention will become clear as the description proceeds.

According to an aspect of this invention, a radio network controller is for use in a mobile communications system. The radio network controller comprises a plurality of protocol processing portions each for performing a ciphering processing on user data according to a predetermined protocol. A control portion controls a protocol processing portion for the user data so as to hand over ciphering parameter in a first protocol processing portion from the first protocol processing portion to a second protocol processing portion when the protocol processing portion for the user data is switched from the first protocol processing portion to the second protocol processing portion.

According to another aspect of this invention, a mobile communications system includes at least one radio network controller. The at least one radio network controller comprises a plurality of protocol processing portions each for performing a ciphering processing on user data according to a predetermined protocol, and a control portion for controlling a protocol processing portion for the user data so as to hand over ciphering parameter in a first protocol processing portion from the first protocol processing portion to a second protocol processing portion when the protocol processing portion for the user data is switched from the first protocol processing portion to the second protocol processing portion. The second protocol processing portion may be provided in another radio network controller.

According to still another aspect of this invention, an operation control method in a mobile communications system including at least one radio network controller. The at least one radio network controller comprises a plurality of protocol processing portions each of which performs a ciphering processing on user data according to a predetermined protocol. The operation control method comprises the step of controlling a protocol processing portion for the user data so as to hand over ciphering parameter in a first protocol processing portion from the first protocol processing portion to a second protocol processing portion when the protocol processing portion for the user data is switched from the first protocol processing portion to the second protocol processing portion.

DESCRIPTION OF THE PREFERRED EMBODIMENTS

Figure 1:
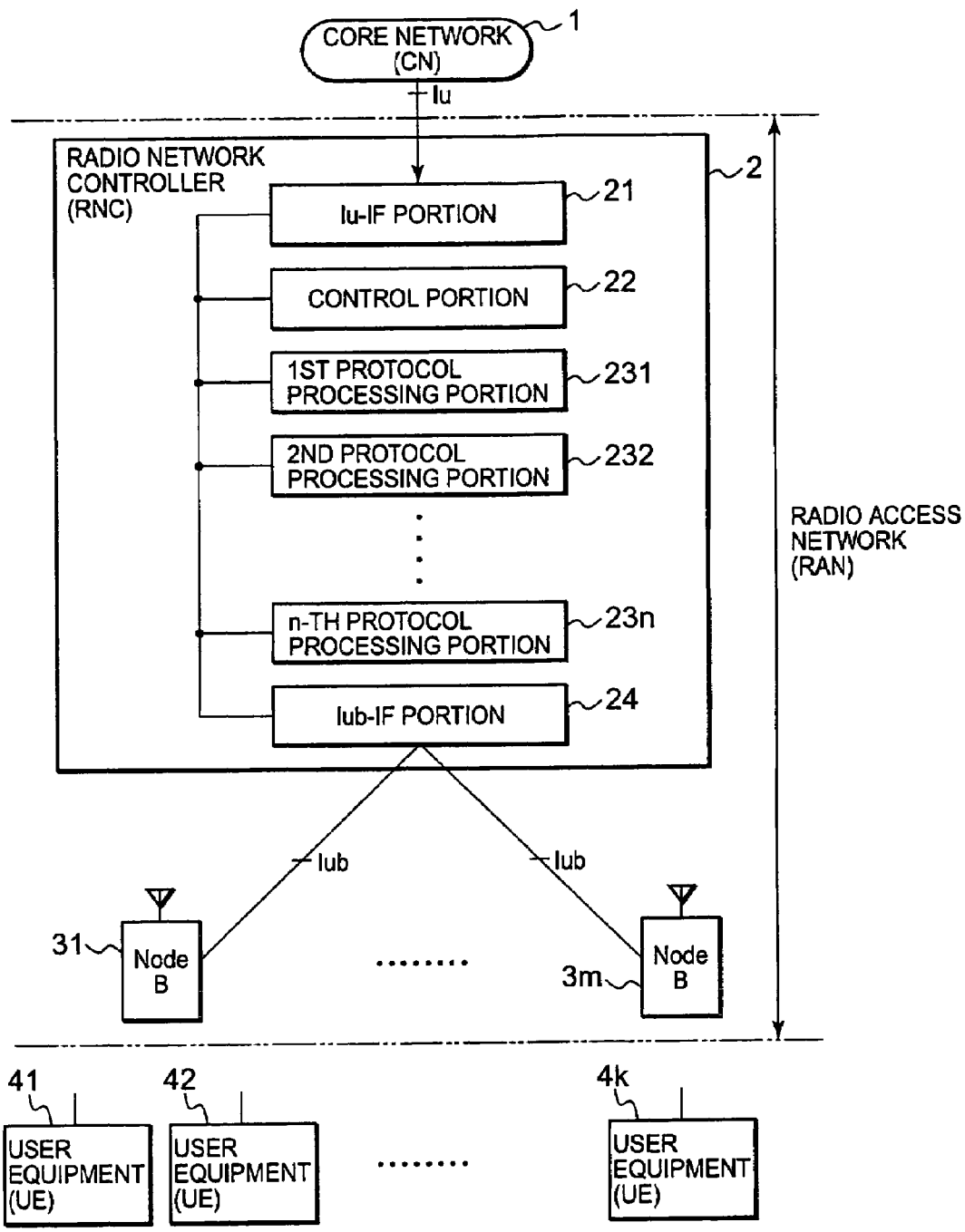
FIG. 1 shows a block diagram of a mobile communications system according to a first embodiment of this invention.

Referring to FIG. 1, the description will proceed to a mobile communications system according to a first embodiment of this invention. The illustrated mobile communications system comprises a radio access network RAN. The radio access network RAN comprises a radio network controller (RNC) 2 and first through m-th radio base stations (Node B) 31 through 3m, where m represents a first positive integer which is not less than two. The radio network controller (RNC) 2 is connected to a core network (CN) 1 via an Iu interface. In addition, the radio network controller (RNC) 2 is connected to the first through the m-th radio base stations (Node B) 31 through 3m via Iub interfaces. The mobile communications system comprises first through k-th mobile units (UE) 41, 42, . . . , and 4k serving under the first through the m-th radio base stations (Node B) 31 through 3m, where k represents a second positive integer which is not less than two. In other words, the first through the m-th radio base stations (Node B) 31 through 3m are connected to the first through the k-th mobile units via radio interfaces.

The mobile unit (UE) is called a user equipment or a mobile communications terminal.

The radio network controller (RNC) 2 comprises an Iu-IF portion 21, a control portion 22, first through n-th protocol processing portions 231, 232, . . . , and 23n, and an Iub-IF portion 24, where n represents a third positive integer which is not less than two. The control portion 22 has a function for calling ciphering parameter from each of the first through the n-th protocol processing portions 231 through 23n, a function for setting the ciphering parameter in each protocol processing portion, a function for instructing the Iub-IF portion 24 and the Iu-IF portion 21 to change a connection destination of user data.

Each of the first through the n-th protocol processing portion 231 through 33n has a function for terminating each protocol of a frame protocol (FP) and media access control (MAC) defined in the 3GPP, a ciphering and deciphering function for the user data, a function for informing the ciphering parameter according to an instruction of the control portion 22, and a function for performing a ciphering setting according to a request of the control portion 22 and for replying after ciphering start.

The Iub-IF portion 24 has a function for transferring user data on an uplink to a corresponding protocol processing portion according to an instruction of the control portion 22, a function for transferring user data on a downlink transmitted from the protocol processing portion to a corresponding radio base station (Node B), and a function for switching a transfer destination of those user data (for example, a function for switching the transfer destination transferred to the first protocol processing portion 231 to the second protocol processing portion 232).

In this event, the Iub-IF portion 24 has a function for transferring the user data on the uplink transmitted from the radio base station (Node B) to one of the first through the n-th protocol processing portions 231-23n according to the instruction of the control portion 22 and for receiving the user data on the downlink transmitted from all of the first through the n-th protocol processing portions 231-23n to transfer to the radio base station (Node B). That is, the Iub-IF portion 24 has a function for allowing reception of a plurality of radio base stations on receiving and for transmitting to only one radio base station on transmitting.

The Iu-IF portion 21 has a function for transferring user data on the downlink to a corresponding protocol processing portion according to an instruction of the control portion 22, a function for transferring user data on the uplink transmitted from the protocol processing portion to a corresponding core network (CN) 1, and a function for switching a transfer destination of those user data (for example, a function for switching the transfer destination transferred to the first protocol processing portion 231 to the second protocol processing portion 232).

In this event, the Iu-IF portion 21 has a function for transferring the user data on the downlink transmitted from the core network (CN) 1 to one of the first through the n-th protocol processing portions 231-23n according to the instruction of the control portion 22 and for receiving the user data on the uplink transmitted from all of the first through the n-th protocol processing portions 231-23n to transfer to the core network (CN) 1. That is, the Iu-IF portion 24 has a function for allowing reception of a plurality of core networks on receiving and for transmitting to only one core network on transmitting.

Inasmuch as the Iub-IF portion 24 and the Iu-IF portion 21 have a function for allowing reception of a plural on receiving and for transmitting to only one on transmitting, it is possible to perform a switching processing of the first through the n-th protocol processing portions 231-23n without interruption.

Furthermore, it is possible to realize the Iub interface for the radio base station (Node B), the Iu interface for the core network (CN), and interface between functions in the radio network controller (RNC) at both of asynchronous transfer mode (ATM) and internet protocol (IP). Inasmuch as the core network (CN) 1, the first through the m-th radio base stations (Node B) 31-3m, and the first through the k-th mobile units (UE) 41-4k, which are components in the mobile communication system illustrated in FIG. 1, are known components defined by the 3GPP and do not directly related to this invention, detailed structure thereof are omitted.

Figure 2:
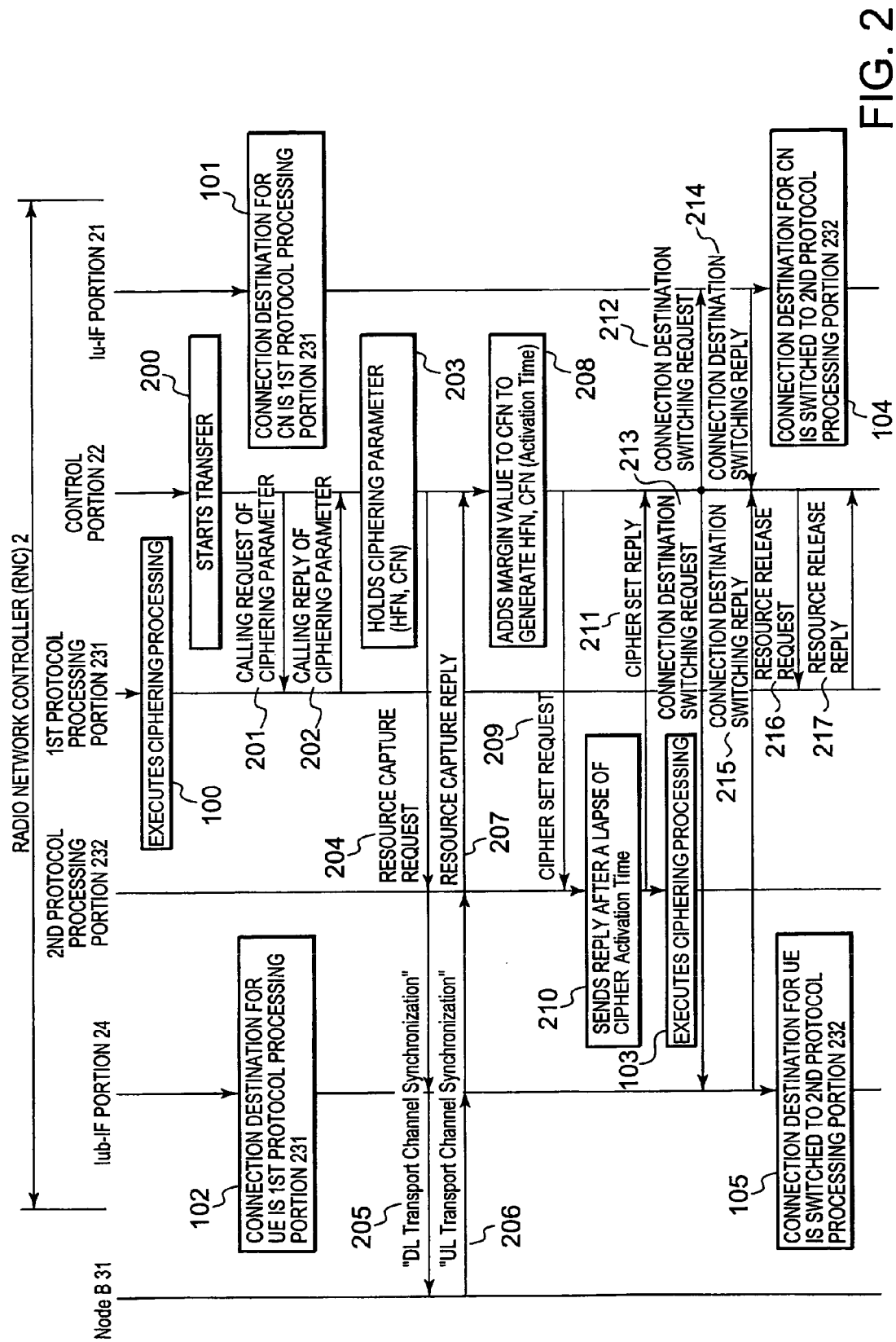
FIG. 2 is a sequence diagram for use in describing operation of the mobile communications system illustrated in FIG. 1.

Referring to FIG. 2, description will be made as regards peculiar operation of the radio network controller (RNC) 2 illustrated in FIG. 1. FIG. 2 is a sequence diagram showing operation of the radio network controller. The description will proceed to operation in a case where user data currently processed in the first protocol processing portion 231 is transferred to the second protocol processing portion 232 in order to execute a firmware renewal or a hardware exchange of the first protocol processing portion 231.

Under the circumstances, the first protocol processing portion 231 executes ciphering processing on the user data (step 100), a connection destination for the core network (CN) 1 in the Iu-IF portion 21 is the first protocol processing portion 231 (step 101), and a connection destination for the mobile units (UE) in the Iub-IF portion 24 is the first protocol processing portion 231 (step 102).

In this state, when the transfer is started (step 200), the control portion 22 carries out a calling request of ciphering parameter for the first protocol processing portion 231 (step 201), and the first protocol processing portion 231 notifies the ciphering parameter of the control portion 22 by a calling reply of the ciphering parameter (step 202).

In this event, the notified ciphering parameter is parameters for the ciphering processing that are a cipher sequence number of 32 bits long, a hyper frame number HFN of a long sequence number, a connection frame number CFN of a short sequence number which are defined in the 3GPP. The hyper frame number HFN and the connection frame number CFN are counted in the first protocol processing portion 231. The control portion 22 holds the hyper frame number HFN and the connection frame number CFN of the ciphering parameter which is called from the first protocol processing portion 231 (step 203).

Subsequently, the control portion 22 sends a resource capture request to the second protocol processing portion 232 (step 204). Responsive to the resource capture request, the second protocol processing portion 232 transmits "DL Transport Channel Synchronization" defined by the 3GPP TS25.402 (step 205), receives "UL Transport Channel Synchronization" from the first radio base station (Node B) (step 206), and sends a resource capture reply to the control portion 22 (step 207).

The "Transport Channel Synchronization" may be executed if the second protocol processing portion 232 recognizes a transmission timing of the connection frame number CFN to be transmitted. In the example being illustrated, the "Transport Channel Synchronization" is executed in order to determine a correct transmission timing. In addition, it is assumed that the Iub-IF portion 24 transmits/receives data to/from the second protocol processing portion 232 on transmitting/receiving the "Transport Channel Synchronization." It is necessary for the Iub-IF portion 24 to identify whether the frame is a data frame or the control frame and to always conduct if the frame is the control frame. In addition, identification of the data frame and the control frame may be carried out by referring a frame type FT described in the 3GPP TS25.427.

Subsequently, the control portion 22 adds a preset margin value to the held connection frame number CFN to obtain or generate a new hyper frame number HFN and a new connection frame number CFN for cipher setting (step 208). In this event, if a result obtained by adding the margin value to the connection frame number CFN spreads 0 over, the control portion 22 increments the hyper frame number HFN by one to obtain the hyper frame number HFN for the cipher setting.

This reason is as follows. Inasmuch as the connection frame number CFN has the value between 0 and 255, 255 is incremented to 0. It is necessary to increment the hyper frame number HFN by 1 in a case where the connection frame number CFN spreads 0 over so as to shift from 255 to 0 when the ciphering process is executed. Accordingly, in order to hand the ciphering parameter over, this disposal is required. Specifically, it is assumed that the held hyper frame number HFN and the held connection frame number CFN are equal to one and two hundred and fifty-four, respectively, namely, HFN=1 and CFN=254, and the margin value is equal to four. In this event, the set hyper frame number HFN and the set connection frame number CFN are two and two, respectively, namely, HFN=2 and CFN=2.

Now, the description will proceed to a reason to add the margin value to the connection frame number CFN. It is necessary to designate a time for starting a ciphering processing, namely, an "Activation Time." It is necessary for the "Activation Time" to take into account an internal processing delay on switching the protocol processing portions. Accordingly, it is necessary to generate a future "Activation Time" so that the internal processing delay is taken into consideration for a current connection frame number CFN.

Subsequently, the control portion 22 sends a cipher set request to the second protocol processing portion 232 with the calculated hyper frame number HFN and the calculated connection frame number CFN for the cipher setting carried on the cipher set request (step 209). After starting the ciphering processing using the set hyper frame number HFN and the set connection frame number CFN (step 210), the second protocol processing portion 232 sends a cipher set reply to the control portion 22 (step 211). In this event, the set connection frame number CFN is called the "Activation Time" for stating the ciphering processing in the manner which is described above. The second processing portion 232 counts the connection frame number CFN therein. When the connection frame number CFN reaches the "Activation Time", the ciphering processing is started.

Subsequently, the control portion 22 confirms that the ciphering processing is started in the second protocol processing portion 232 on the basis of the cipher set replay sent from the second protocol processing portion 232 and sends a connection destination switching request to the Iu-IF portion 21 and the Iub-IF portion 24 (steps 212 and 213).

Although the Iu-IF portion 21 operates with the connection destination for the core network (CN) 1 set in the first protocol processing portion 231, the Iu-IF portion 21 changes the connection destination for the core network (CN) 1 to the second protocol processing portion 232 in accordance with the connection destination switching request sent from the control portion 22 and sends a connection destination switching reply to the control portion 22 (step 214).

Although the Iub-IF portion 24 operates with the connection destination for the first mobile unit (UE) 41 set in the first protocol processing portion 231, the Iub-IF portion 24 changes the connection destination for the first mobile unit (UE) 41 to the second protocol processing portion 232 in accordance with the connection destination switching request sent from the control portion 22 and sends a connection destination switching reply to the control portion 22 (step 215).

Finally, the control portion 22 sends a resource release request to the first protocol processing portion 231 (step 216). Responsive to the resource release request, the first protocol processing portion 231 releases resource in question and sends a resource release reply to the control portion 22 (step 217). Therefore, the connection destination for the core network (CN) 1 in the Iu-IF portion 21 is switched to the second protocol processing portion 232 (step 104) while the connection destination for the first mobile unit (UE) 41 in the Iub-IF portion 24 is switched to the second protocol processing portion 232 (step 105). And, the second protocol processing portion 232 executes ciphering processing on the user data (step 103).

Inasmuch as a series of operation and control described above is performed within the radio network controller (RNC) 2, the mobile units (UE) and the core network (CN) do not require processing with the operation of this invention.

Figure 3:
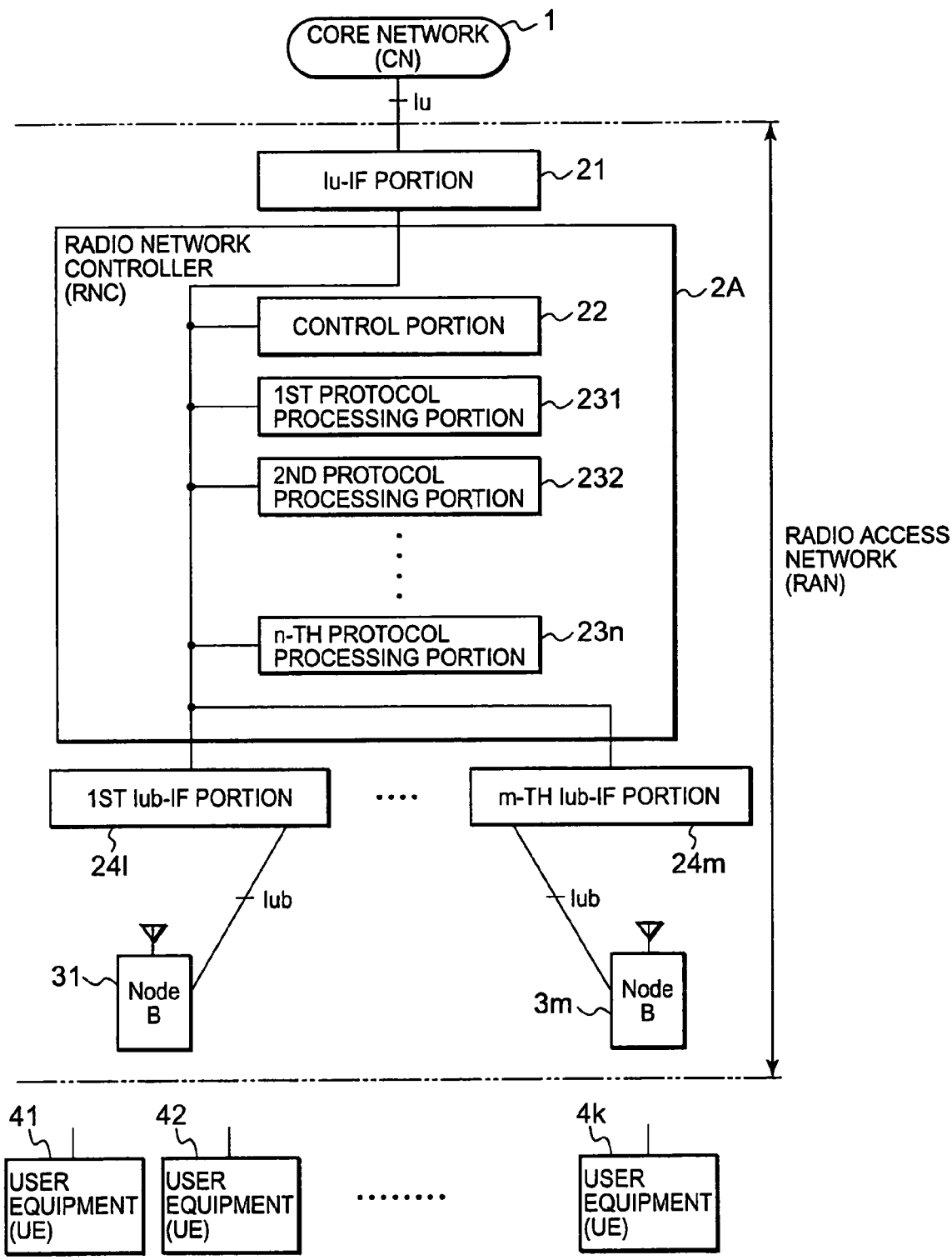
FIG. 3 shows a block diagram of a mobile communications system according to a second embodiment of this invention.

Referring to FIG. 3, the description will proceed to a mobile communication system according to a second embodiment of this invention. The illustrated mobile communication system is similar in structure and operation to the mobile communication system illustrated in FIG. 1 except that the radio access network RAN is modified from that illustrated in FIG. 1 as will later become clear. Similar portions in FIG. 1 are depicted at the same reference symbols. In the radio access network RAN, functions of the Iub-IF portion and the Iu-IF portion are taken out from components in a radio network controller (RNC) 2A to the mobile units (UE) side and the core network (CN) side.

More specifically, the radio access network RAN comprises the Iu-IF portion 21, the radio network controller (RNC) 2A, first through m-th Iub-IF portions 241-24m, and the first through the m-th radio base stations (Node B) 31-3m. The radio network controller (RNC) 2A comprises the control portion 22 and the first through the n-th protocol processing portions 231-23n. The first through the m-th Iub-IF portions 241-24m are not components in the radio network controller (RNC) 2A and have a one-to-one correspondence with the m-th base stations (Node B) 31-3m. The Iu-IF portion 21 is not a component in the radio network controller (RNC) 2A and corresponds to the core network (CN) 1. The operation of the mobile communication system illustrated in FIG. 3 is similar to that described in conjunction with FIG. 2.

Figure 4:
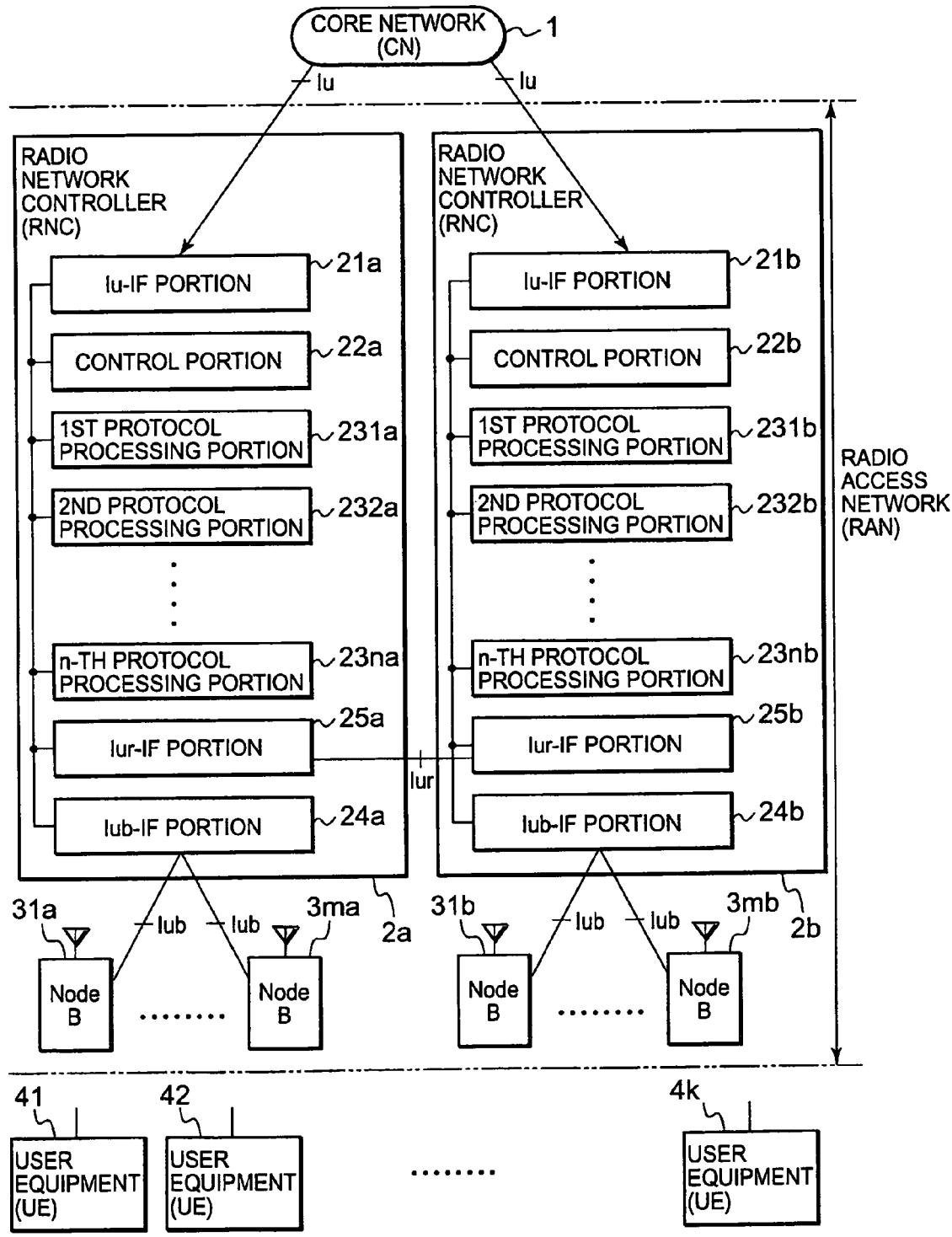
FIG. 4 shows a block diagram of a mobile communications system according to a third embodiment of this invention.

Referring to FIG. 4, the description will proceed to a mobile communication system according to a third embodiment of this invention. The illustrated mobile communication system is similar in structure and operation to the mobile communication system illustrated in FIG. 1 except that the radio access network RAN is modified from that illustrated in FIG. 1 as will later become clear. Similar portions in FIG. 1 are depicted at the same reference symbols.

The radio access network RAN comprises a primary radio network controller (RNC) 2a, a subsidiary radio network controller (RNC) 2b, first through m-th primary radio base stations (Node B) 31a-3ma, and first through m-th subsidiary radio base stations (Node B) 31b-3mb.

The primary radio network controller (RNC) 2a is connected to the core network (CN) 1 via the Iu interface. The primary radio network controller (RNC) 2a is connected to the first through the m-th primary radio base stations (Node B) 31a-3ma via the Iub interfaces. Likewise, the subsidiary radio network controller (RNC) 2b is connected to the core network (CN) 1 via the Iu interface. The subsidiary radio network controller (RNC) 2b is connected to the first through the m-th subsidiary radio base stations (Node B) 31b-3mb via the Iub interfaces. The primary radio network controller (RNC) 2a and the subsidiary radio network controller (RNC) 2b are connected to each other via an Iur interface.

The primary radio network controller (RNC) 2a comprises a primary Iu-IF portion 21a, a primary control portion 22a, first through n-th primary protocol processing portions 231a, 232a, . . . , and 23na, a primary Iub-IF portion 24a, and a primary Iur-IF portion 25a. Similarly, the subsidiary radio network controller (RNC) 2b comprises a subsidiary Iu-IF portion 21b, a subsidiary control portion 22b, first through n-th subsidiary protocol processing portions 231b, 232b, . . . , and 23nb, a subsidiary Iub-IF portion 24b, and a subsidiary Iur-IF portion 25b.

The primary Iur-IF portion 25a and the subsidiary Iur-IF portion 25b are connected to each other via the Iur interface. The primary Iur-IF portion 25a has a function for interfacing with the subsidiary radio network controller (RNC) 2b while the subsidiary Iur-IF portion 25b has a function for interfacing with the primary radio network controller (RNC) 2a.

In the manner which is similar to operation described in conjunction with FIG. 2, it is possible to hand over processing from a protocol processing portion in the primary radio network controller (RNC) 2a to another protocol processing portion in the subsidiary radio network controller (RNC) 2b and to hand over processing in the opposite direction thereto.

The first through the n-th primary protocol processing portions 231a-23na are controlled by the primary control portion 22a while the first through the n-th subsidiary protocol processing portions 231b-23nb are controlled by the subsidiary control portion 22b. The primary control portion 22a and the subsidiary control portion 22b have functions for going by way of control each other. Accordingly, the primary control portion 22a does not directly control the first through the n-th subsidiary protocol processing portions 231b-23nb in the subsidiary radio network controller (RNC) 2b but controls the first through the n-th subsidiary protocol processing portions 231b-23nb via the subsidiary control portion 22b. Similarly, the subsidiary control portion 22b does not directly control the first through the n-th primary protocol processing portions 231a-23na in the primary radio network controller (RNC) 2a but controls the first through the n-th primary protocol processing portions 231*a*-23*na* via the primary control portion 22*a*.

While this invention has thus far been described in conjunction with a few embodiments thereof, it will readily be possible for those skilled in the art to put this invention into practice in various other manners.

What is claimed is:

1. A radio network controller for use in a mobile communications system, said radio network controller comprising:
   a plurality of protocol processing portions each for performing a ciphering processing on user data according to a predetermined protocol; and
   a control portion for controlling a protocol processing portion for said user data so as to hand over a ciphering parameter in a first protocol processing portion from the first protocol processing portion to a second protocol processing portion when the protocol processing portion for said user data is switched from the first protocol processing portion to the second protocol processing portion,
   wherein said control portion reads the ciphering parameter from said first protocol processing portion to set the ciphering parameter in said second protocol processing portion.

2. A radio network controller for use in a mobile communications system, said radio network controller comprising:
   a plurality of protocol processing portions each for performing a ciphering processing on user data according to a predetermined protocol; and
   a control portion for controlling a protocol processing portion for said user data so as to hand over a ciphering parameter in a first protocol processing portion from the first protocol processing portion to a second protocol processing portion when the protocol processing portion for said user data is switched from the first protocol processing portion to the second protocol processing portion,
   wherein said control portion reads the ciphering parameter from said first protocol processing portion, and generates a new ciphering parameter for said ciphering parameter in consideration of a processing delay to set the new ciphering parameter in said second protocol processing portion.

3. The radio network controller as claimed in claim 1, wherein said control portion switches a connection destination for said user data into said second protocol processing portion in response to an end of handover of said ciphering parameter to said second protocol processing portion.

4. A mobile communications system including at least one radio network controller, said at least one radio network controller comprising:
   a plurality of protocol processing portions each for performing a ciphering processing on user data according to a predetermined protocol; and
   a control portion for controlling a protocol processing portion for said user data so as to hand over a ciphering parameter in a first protocol processing portion from the first protocol processing portion to a second protocol processing portion when the protocol processing portion for said user data is switched from the first protocol processing portion to the second protocol processing portion,
   wherein said control portion reads the ciphering parameter from said first protocol processing portion to set the ciphering parameter in said second protocol processing portion.

5. A mobile communications system including at least one radio network controller, said at least one radio network controller comprising:
   a plurality protocol processing portions each for performing a ciphering processing on user data according to a predetermined protocol; and
   a control portion for controlling a protocol processing portion for said user data so as to hand over a ciphering parameter in a first protocol processing portion from the first protocol processing portion to a second protocol processing portion when the protocol processing portion for said user data is switched from the first protocol processing portion to the second protocol processing portion,
   wherein said control portion reads the ciphering parameter from said first protocol processing portion, and generates a new ciphering parameter for said ciphering parameter in consideration of a processing delay to set the new ciphering parameter in said second protocol processing portion.

6. The mobile communications system as claimed in claim 4, wherein said control portion switches a connection destination for said user data into said second protocol processing portion in response to an end of handover of said ciphering parameter to said second protocol processing portion.

7. The mobile communications system as claimed in claim 4, wherein said second protocol processing portion is provided in another radio network controller.

8. An operation control method in a mobile communications system including at least one radio network controller, said at least one radio network controller comprising a plurality of protocol processing portions each of which performs a ciphering processing on user data according to a predetermined protocol, said operation control method comprising the step of:
   controlling a protocol processing portion for said user data so as to hand over a ciphering parameter in a first protocol processing portion from the first protocol processing portion to a second protocol processing portion when the protocol processing portion for said user data is switched from the first protocol processing portion to the second protocol processing portion,
   wherein said control step comprises the steps of:
   reading the ciphering parameter from said first protocol processing portion; and
   setting the ciphering parameter in said second protocol processing portion.

9. An operation control method in a mobile communications system including at least one radio network controller, said at least one radio network controller comprising a plurality of protocol processing portions each of which performs a ciphering processing on user data according to a predetermined protocol, said operation control method comprising the step of:
   controlling a protocol processing portion for said user data so as to hand over a ciphering parameter in a first protocol processing portion from the first protocol processing portion to a second protocol processing portion when the protocol processing portion for said user data is switched from the first protocol processing portion to the second protocol processing portion, wherein said control step comprises the steps of:
reading the ciphering parameter from said first protocol processing portion;
generating a new ciphering parameter for said ciphering parameter in consideration of a processing delay; and
setting the new ciphering parameter in said second protocol processing portion.

10. The operation control method as claimed in claim 8, wherein further comprises the step of:

switching a connection destination for said user data into said second protocol processing portion in response to an end of handover of said ciphering parameter to said second protocol processing portion.

11. The operation control method as claimed in claim 8, wherein said second protocol processing portion is provided in another radio network controller.

* * * * *